United States Patent [19]
Palazzo

[11] Patent Number: 6,022,435
[45] Date of Patent: Feb. 8, 2000

[54] METHOD OF MAKING A DOUBLE WALL STORAGE TANK HAVING AN OUTER JACKET BONDED AROUND AN APERTURE

[75] Inventor: David T. Palazzo, Tampa, Fla.

[73] Assignee: Titan Technologies (USA), Inc., Tampa, Fla.

[21] Appl. No.: 09/340,520

[22] Filed: Jun. 28, 1999

Related U.S. Application Data

[63] Continuation-in-part of application No. 08/735,610, Oct. 23, 1996, Pat. No. 5,816,435, and a division of application No. 08/795,604, Feb. 5, 1997, Pat. No. 5,915,586.

[51] Int. Cl.[7] .................................................. B65D 25/00
[52] U.S. Cl. ...................... 156/187; 220/586; 220/567.2; 220/4.13
[58] Field of Search ............................. 156/187; 220/565, 220/567.2, 4.13, 62.19, 62.22, 586

[56] References Cited

U.S. PATENT DOCUMENTS

| | | | |
|---|---|---|---|
| Re. 34,203 | 3/1993 | Palazzo | 220/445 |
| 3,616,006 | 10/1971 | Landgraf et al. | 156/188 |
| 3,687,765 | 8/1972 | MacLean et al. | 156/187 |
| 3,802,908 | 4/1974 | Emmons | 117/72 |
| 4,130,453 | 12/1978 | Hollister | 156/187 |
| 4,178,200 | 12/1979 | Hakert et al. | 156/187 |
| 4,523,454 | 6/1985 | Sharp | 73/49.2 |
| 4,607,522 | 8/1986 | Sharp | 73/49.2 |
| 4,640,439 | 2/1987 | Palazzo | 220/445 |
| 4,644,627 | 2/1987 | Palazzo | 29/423 |
| 4,655,367 | 4/1987 | Palazzo | 220/445 |
| 4,708,015 | 11/1987 | Sharp | 73/49.2 |
| 4,744,137 | 5/1988 | Palazzo | 29/455 R |
| 4,780,946 | 11/1988 | Palazzo | 29/455.1 |
| 4,780,947 | 11/1988 | Palazzo | 29/455.1 |
| 4,927,050 | 5/1990 | Palazzo | 220/445 |
| 5,439,711 | 8/1995 | Vu et al. | 427/430.1 |
| 5,494,183 | 2/1996 | Sharp | |
| 5,551,590 | 9/1996 | Mazur et al. | 220/586 X |
| 5,553,734 | 9/1996 | Sharp | 220/589 X |

OTHER PUBLICATIONS

Advanced Technology for Industrial Products Production by Advanced Plasma Systems, Inc.
The Duval Pipeline Protection Philosophy by T.A. Pfaff.
Thermoplastic Powder Coating and Equiptment by FLAMECOAT Systems.
Surface Treatment of Marlex Polyolefins for Decorating and Adhesive Bonding, by Phillips Chemical Co, Aug. 1979.
Extrusion Technology, by Genca, 1995.

*Primary Examiner*—Steven Pollard
*Attorney, Agent, or Firm*—Carlton, Fields et al.

[57] ABSTRACT

A multiple wall tank for the storage of liquids is manufactured from a rigid inner tank having at least one aperture by applying a layer of a synthetic resin material to the inner tank exterior surface around the aperture, providing a spacing means to provide for substantially free passage of liquids along at least a portion of the inner tank, applying over the layer of synthetic resin and the inner tank an outer sheath of a thermoplastic synthetic resin material, and bonding the outer sheath to the resin material layer surrounding and proximal to the aperture to form a substantially liquid-impervious seal around the aperture.

22 Claims, 6 Drawing Sheets

METHOD OF MAKING A DOUBLE WALL STORAGE TANK HAVING AN OUTER JACKET BONDED AROUND AN APERTURE

RELATED APPLICATIONS

This a continuation-in-part of U.S. patent application Ser. No. 08/735,610, entitled A DOUBLE WALL STORAGE TANK HAVING AN EXTRUDED OUTER SHEATH AND A METHOD FOR MAKING SAME, filed Oct. 23, 1996, U.S. Pat. No. 5,816,435 and a division of Ser. No. 08/795,604, filed Feb. 5, 1997 U.S. Pat. No. 5,915,586.

FIELD OF INVENTION

This invention relates to tanks for the storage of liquids, and more particularly to multiple wall tanks for the storage of liquids. Even more specifically, the invention relates to a double wall storage tank having an outer sheath of a thermoplastic synthetic resin material bonded around an inner tank aperture and a method for making same.

BACKGROUND OF THE INVENTION

Tanks for the storage of liquids have been constructed in a variety of ways from a variety of materials. In one common application, the storage of hydrocarbons, such as gasoline and other petroleum products, the tanks have conventionally been fabricated out of steel or fiberglass, most commonly with a single rigid wall. In many applications, this construction has proved reasonably satisfactory, with such tanks functioning properly for many years before requiring repair or replacement. However, the increasing age of many of the tanks currently in place is beginning to present serious environmental dangers. Many of the older steel tanks buried underground have rusted and are beginning to leak, thus releasing the petroleum materials into the ground where they may seep into and pollute underground water supplies. While rust-proof, some fiberglass tanks have also exhibited leakage, causing similar problems.

One of the primary problems with leaking storage tanks has been the difficulty or inability to ascertain when or if such leaks are occurring from a given tank. Because the excavation and removal of such a storage tank, which may contain thousands of gallons of fuel, is an expensive and difficult undertaking, such an operation is difficult to justify unless there is some evidence of actual leakage.

Because of the increasing potential danger of leaking storage tanks, particularly in communities that utilize ground water for public consumption, many municipalities have implemented or plan to implement ordinances requiring the use of double wall storage tanks underground and requiring replacement of existing single wall tanks. While the installation of a conventional double wall tank in a new facility entails no great difficulty and a generally manageable increase in cost over a single wall tank, a heavy burden exists for complying with such ordinances by replacing existing sound, single wall tanks with double wall tanks. This burden has prompted the search for methods of fabricating relatively inexpensive double wall or multi-wall tanks. This burden has also given impetus to the search for a method of remanufacturing existing single wall tanks into double or multi-wall assemblies with means for detecting the presence of any leaks into the space between the walls.

Several methods for manufacturing double wall tank assemblies have been developed, including that disclosed by David T. Palazzo, the inventor of the present invention, in U.S. Pat. No. 4,640,439 and its progeny. This patent generally discloses applying a spacing material over a rigid inner tank and bonding resin impregnated glass fiber mats to the exterior surface of spacing material to form a double wall tank. While conventional glass fiber provides a relatively effective and inexpensive outer sheath, other materials, such as polyolefins, exist that may provide a convenient alternative to forming a substantially liquid impervious outer shell around the rigid inner tank.

A thermoplastic synthetic resin material, such as polyethylene, has been extruded onto the surfaces of steel pipes as disclosed in U.S. Pat. No. 4,478,200 to Hakert, et al., and U.S. Pat. No. 3,616,006 to Landgraf, et al. However, these materials ordinarily will not bond adequately to metallic or steel surfaces, with or without adhesives, as is taught by these and other references. When fabricating a multiple wall storage tank, it is often desired, if not essential, to bond an outer jacket to the inner tank, which is typically formed of steel, around the fittings or apertures that may be formed through many conventional single wall tanks in order to prevent leakage around these fittings.

SUMMARY OF THE INVENTION

In view of the foregoing, it is an object of the present invention to provide an economical method of manufacturing a multiple wall storage tank from a rigid, single wall tank. It is a further object of the invention to provide a method for manufacturing a multiple wall storage tank having a generally rigid, liquid-impervious outer sheath bonded around fittings or apertures, which may be formed through the conventional inner tank. Still another object of the present invention is to provide an efficient and relatively simple method of manufacturing a multiple wall storage tank from a rigid, single wall tank.

To achieve these and other objects that will become readily apparent to those skilled in the art, this invention provides a double wall tank for the storage of liquids and a method of manufacturing a rigid multiple wall tank for the storage of liquid from a single wall inner tank. The double wall tank of the present invention includes a rigid inner tank having generally cylindrical sidewall portions, end portions generally transverse to the sidewall portions and a central axis extending generally longitudinally between the end portions, with the inner tank having an exterior surface and at least one aperture formed through the inner tank. An outer sheath of a substantially liquid-impervious thermoplastic synthetic resin material surrounds the inner tank, and a layer of a first thermoplastic synthetic resin material is bonded between the inner tank and the outer sheath surrounding and proximal to the aperture, such that a substantially liquid-impervious seal is formed between the outer sheath and the inner tank around the aperture. Spacing means is positioned intermediate the inner tank and the outer sheath to provide for substantially free passage of liquids between a substantial portion of the exterior surface of the inner tank and at least a portion of the outer sheath.

The method of the present invention includes the steps of providing a rigid inner tank having generally cylindrical sidewall portions, end portions generally transverse to the sidewall portions and a central axis extending generally longitudinally between the end portions, with the inner tank having an exterior surface and at least one aperture formed through the inner tank. A first thermoplastic synthetic resin material is applied to a portion of the exterior surface of the inner tank surrounding and proximal to at least a portion of the aperture to define a layer of resin material surrounding and proximal to the aperture. An outer sheath of a substantially liquid-impervious thermoplastic synthetic resin material is applied over the inner tank and the synthetic resin layer, with spacing means being provided intermediate the exterior surface of the inner tank and the outer sheath to provide for substantially free passage of liquids between a substantial portion of the exterior surface of the inner tank and at least a portion of the outer sheath. The outer sheath is then bonded to the resin layer surrounding and proximal to the aperture, such that a substantially liquid-impervious seal is formed between the outer sheath and the outer tank around the aperture.

BRIEF DESCRIPTION OF THE DRAWINGS

Particularly preferred embodiments of the method of the present invention will be described in detail below in connection with the following drawings in which.

DETAILED DESCRIPTION OF PREFERRED EMBODIMENTS

Figure 1:
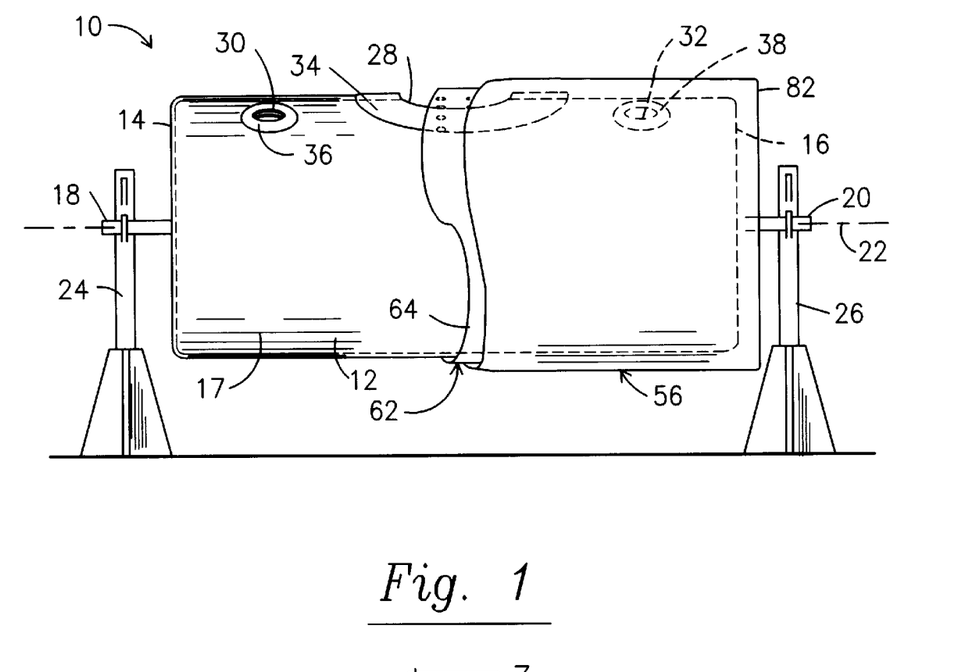
FIG. 1 is a side elevation, partially in section, of a tank according to the present invention, illustrating various steps in the fabrication process.

Preferred embodiments of the apparatus of the present invention are illustrated in FIGS. 1–16 in which similar reference numbers refer to corresponding elements in the various views. FIG. 1 illustrates a tank fabricated according to a preferred method of the present invention, in which is provided a rigid inner tank, generally indicated as 10, having generally cylindrical sidewall portions 12, closed end portions 14 and 16, which are generally transverse to the sidewall portions 12. Elongated spindle members 18 and 20 are attached to and extend outwardly of each of the end portions 14 and 16, respectfully, generally coaxially with the central axis of the inner tank 10, illustrated as reference number 22. As illustrated in FIG. 1, the spindle members 18 and 20 may be supported by fixed supports 24 and 26 upon which the inner tank 10 may conveniently be rotated about its axis 22, such as by a motor or any conventional means, to facilitate the fabrication of the multiple wall storage tank. Alternatively, rather than having spindle members 18 and 20 attached to the end portions 14 and 16 of the inner tank 10, two or more straps, such as continuous belts, may be positioned around a portion of the tank sidewall portions 12. The straps would then be simultaneously advanced in a conventional manner in order to rotate the tank 10 generally about its longitudinal axis 22. Still another approach woud be to position inner tank 10 on a series of rollers to rotate inner tank 10 generally about its axis 22.

While various forms and shapes of tanks may be utilized in practicing this invention, the most common shape utilized for such storage tanks is that of a cylinder, generally a right circular cylinder, having closed end portions 14 and 16. For simplicity of illustration this configuration of tank is utilized for illustrating a preferred embodiment of this invention. Also, while virtually any construction of rigid inner tank 10, whether metal or fiberglass or other materials, may be utilized in practicing this invention, one preferred and readily available type of structure is a tank formed of welded steel, having an appropriate corrosion resistant coating on its surfaces. Although the inner tank may have a corrosion resistant coating, it is not strictly necessary because a later applied outer sheath acts as a corrosion resistant barrier. For purposes of illustration such a steel tank 10 will be described. It is also to be understood that the tank 10 may be a newly fabricated tank, which may or may not have a manway opening or fittings cut in it, or it may be a previously used tank removed from its prior installation and cleaned for remanufacturing in accordance with this invention.

To prepare an uncoated or previously used steel inner tank 10, it is desirable that the exterior surface of the tank be conventionally grit blasted and it may even be coated with a rust inhibitive material. It is preferred that the spindle members 18 and 20 may be attached, suitably by welding, to the center of the end portions 14 and 16, generally coaxial with the tank axis 22, as set forth above. While the present invention will be described as a series of steps, it will be understood and appreciated by those of ordinary skill in the art that the order of various steps may be modified without departing from the spirit and scope of this invention, unless otherwise indicated. Accordingly, a rigid inner tank 10 is provided that has at least one aperture, suitably a manway, indicated by reference number 28 on FIGS. 1 and 2, or a plurality of apertures, including manway 28, and fittings 30 and 32, formed through the sidewall portions 12. Apertures 30 and 32 are illustrated as fittings that include interior threads, which may conveniently be connected to conventional piping for adding liquids to or withdrawing liquids from tank 10. During the fabrication process, it may be desirable to cover or close such apertures, such as by welding an appropriately configured sheet of steel generally flush with the inner tank exterior surface 17. It will become apparent that the method of the present invention may be applied to a new tank that does not include such apertures, and that appropriate such apertures may be formed through the tank late in the fabrication process. In order to simplify this description, however, the preferred embodiment described herein will assume that the inner tank 10 includes at least one such aperture.

Figure 2:
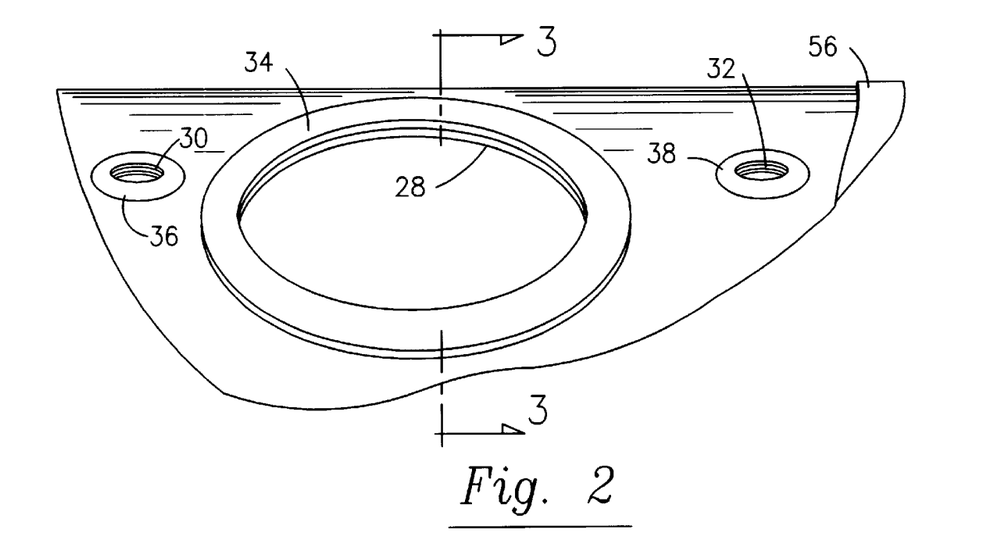
FIG. 2 is a fragmentary upper perspective view of the tank of FIG. 1, illustrating the layer of material surrounding the apertures.

As shown in FIG. 2, a synthetic resin material 34, which may conveniently be a thermoplastic resin material, such as a polyolefin, namely polyethylene or polypropylene, as well as other suitable materials known in the art, is applied to a predetermined portion of the exterior surface of the inner tank surrounding and proximal to at least a portion of the aperture 28 to form a layer of material 34 around aperture 28. Preferably, at least a portion of the resin layer 34 is treated, such as being oxidized, in a conventional manner to promote its adhesion to the inner tank 10. Additional resin layers 36 and 38 are also conveniently applied to the inner tank 10 around apertures 32 and 34 in a similar manner. Where the inner tank 10 includes no apertures, the resin layer or layers should be applied to the inner tank exterior surface 17 at a predetermined position through where such apertures may be formed subsequent to the application of the outer sheath. It will be understood and appreciated that, while three individual resin layers 34, 36 and 38 are illustrated in the figures, a unitary resin layer may also be used, such as where the apertures 28, 30 and 32 are sufficiently proximal one another.

In a preferred embodiment shown in FIG. 2, a portion, preferably at least the lower surface, of each layer 34, 36 and 38 is conveniently treated, such as being oxidized, to produce a receptive polar surface to promote the adhesion of the respective resin layers 34, 36 and 38 to the exterior surface of the inner tank 10. Numerous suitable methods of surface treatment are available for providing appropriate bonding between the tank 10 and the resin layers 34, 36 and 38, such as, for example, flame treatment and electrical treatment, including plasma etching, as well as others known in the art.

One preferred method for applying the resin layers 34, 36 and 38 to the inner tank 10 includes providing preformed patches of a suitable thermoplastic resin material, such as a polyolefin material, with at least a portion of each respective patch positioned proximal to and surrounding its adjacent aperture 28, 30 and 32, as shown in FIG. 2, with the opening formed through each patch aligned generally with its corresponding aperture. While such patches are shown to have openings formed through each respective patch that generally correspond to the size and shape of apertures 28, 30 and 32, such patches may also be generally solid sheets, with the apertures being cut through the sheets later in the fabrication process.

When treating patches by a plasma etching process, the process may be performed on a batch or a continuous basis, depending upon the particular equipment involved. Suitable plasma processing equipment includes, for example, the B Series commercially available from Advanced Plasma Systems, Inc. of St. Petersburg, Fla., among other models and vendors. A benefit of plasma treatment is that only the surface of the material is affected. Thus, the material properties beneath the surface of the patch remain substantially unchanged.

Figure 3:
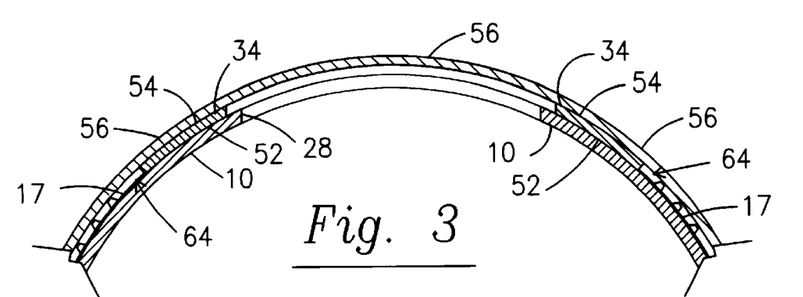
FIG. 3 is a fragmentary sectional view taken along line 3—3 of the tank of FIG. 2, illustrating the various layers of material applied in the fabrication process.
Figure 4:
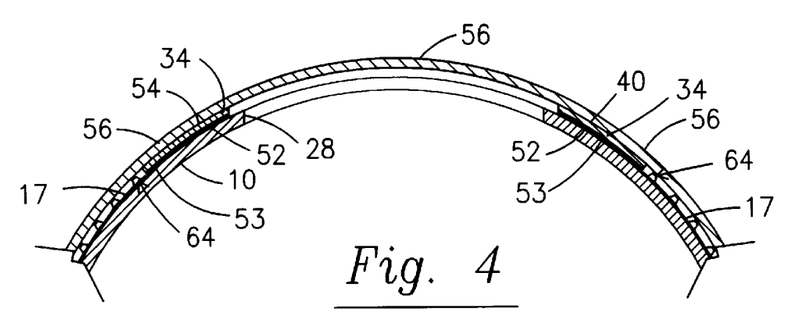
FIG. 4 is a fragmentary sectional view similar to FIG. 3, illustrating an alternative preferred embodiment with an additional layer of material applied proximal the aperture.

Once the patch 40 has been appropriately treated, the patch inner surface 52 may be directly bonded to the inner tank exterior surface 17, as shown in FIG. 3. Typically, a layer of an adhesive material 53, suitably an epoxy resin, may be interposed between the inner surface 52 of patch and the inner tank exterior surface 17, as shown in FIG. 4. Then, by urging the inner surface 52 of patch 40 and the inner tank exterior surface 17 into engagement with the adhesive material 53, the patch 40 is appropriately secured to the inner tank exterior surface 17 surrounding aperture 28. In addition, it may be preferable to remove at least a portion of the outer surface 54 of patch 40, suitably by sanding, grinding or other appropriate processes known in the art, in order to remove the oxidized outer surface layer to facilitate the adhesion between a subsequently applied outer sheath 56 and the patch second surface 54.

It may be desirable to coat the treated surface 52 of the patch 40 with an appropriate adhesive, such as an epoxy resin or other materials known in the art, soon after such treatment. In general, this reduces the possibility of the surface treatment becoming contaminated or otherwise ineffective due to, for example, environmental exposure. In order to facilitate the attachment of such a patch 40, the adhesive coated surface may be modified, suitably through light grit blasting or chemical cleaning, just prior to attaching to the inner tank exterior surface 17 to which has been applied an additional adhesive material, suitably an epoxy resin. The outer surface 54 is preferably untreated or, if treated, the surface treatment may conveniently be removed to promote bonding to the thermoplastic synthetic resin outer jacket that is to be applied subsequently, as described herein. Alternatively, rather than removing the surface treatment or oxidation from the outer surface 54, a protective film or mask may be temporarily applied to the outer surface 54 before the surface treatment process, such that subsequent to the surface treatment, the mask may be removed to expose the untreated and unoxidized outer surface 54.

An alternative preferred approach to applying resin layers 34, 36 and 38 includes flame spraying an appropriate thermoplastic synthetic resin material, such as polyethylene, which may be in powder form, directly onto the inner tank exterior surface 17 to form a layer of material around the apertures. Suitable flame spray systems include the 124 Flame Spray System available from Plastic FLAMECOAT® Systems of Big Spring, Tex. Of course, other appropriate systems may also be obtained from other vendors. Resin layers 34, 36 and 38 are flame-sprayed onto the inner tank exterior surface surrounding and proximal to at least a portion of the apertures 28, 30 and 32, respectively. In order to facilitate the bonding of the flame-sprayed resin layer 34, 36 and 38, it may be preferable to heat the inner tank proximal the apertures 28, 30 and 32 as the resin layers 34, 36, and 38 are flame-sprayed onto the inner tank exterior surface 17.

Figure 5:
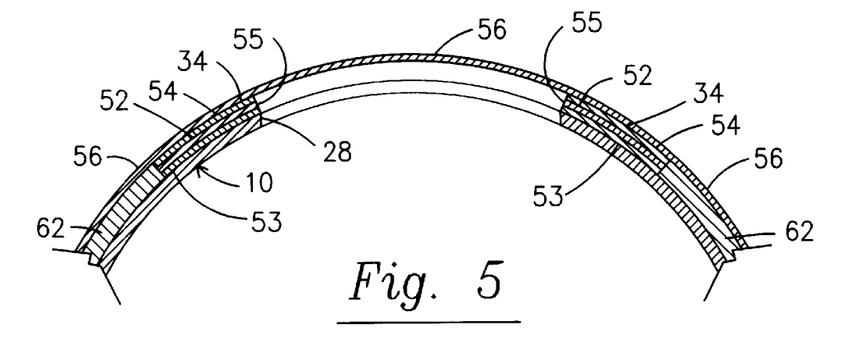
FIG. 5 is a fragmentary sectional view similar to FIG. 4, illustrating yet another alternative preferred embodiment of with an additional layer of material applied proximal the aperture.

As shown in FIG. 5, another preferred embodiment for applying the thermoplastic synthetic resin layer 34 to the inner tank 10 includes forming a substantially monolithic layer of materials surrounding and proximal to aperture 28. This may be accomplished by heating the inner tank exterior surface proximal to and surrounding the aperture 28 and applying a layer of thermosetting material 53, such as an epoxy, a polyester or a phenolic material, to a portion of the inner tank exterior surface 17 surrounding and proximal to aperture 28. Preferably, thermosetting material 53 is a fusion bond epoxy having a thickness that may vary between about 3 mils to about 25 mils and which is applied in powder form, with the heated substrate, namely the inner tank exterior surface 17, melting the powder into a substantially continuous and viscous layer of material surrounding aperture 28. Prior to applying thermosetting material 53, it is preferable that the exterior surface 17 be appropriately conditioned, which conveniently may include grit blasting, to facilitate bonding between thermosetting material 53 and the inner tank exterior surface 17.

An adhesive material 55, which may be a thermoplastic synthetic resin adhesive material known in the art, and preferably a chemically modified polyolefin adhesive powder, such as used in the DUVAL Coating System, is applied to at least a portion, and suitably all, of the thermosetting material 53, preferably before thermosetting material 53 cures, such that adhesive material 55 chemically bonds to thermosetting material 53. Next, a thermoplastic resin material 34, which may suitably be a powder grade polyolefin material, such as polyethylene, polypropylene, polyvinyl chloride, NYLON or a coal tar material, is applied to the substantially viscous layer of adhesive material 53 surrounding aperture 28. The particular selection of material 34 will vary depending on the intended effect as well as which materials are selected for materials 53 and 55. Again, heating the substrate 17 causes the resin layer 34 to become viscous and enable it to chemically bond to adhesive layer 55 when cooled. The thicknesses of materials 55 and 34 may also be varied to suit requirements, typically between about 5 mils and about 40 mils, although other thicknesses of material may suffice. Preferably, each of the three layers of thermosetting material 53, adhesive 55 and synthetic resin material 34 is applied in powder form that melts after contacting the heated tank or the heated previously applied layer, thereby forming three viscous layers that chemically bond to their respective adjacent materials when cooled to define a substantially composite layer between inner tank 10 and the subsequently applied outer sheath 56. The outer sheath 56 may then be applied over the resin layer 34 in a conventional manner, such as stated herein. While it is preferable that each layer of material be applied in a powder form to its respective heated substrate, it will be understood and appreciated that other configurations of the appropriate materials, such as sheets of film and liquids, may be used with equal facility.

As shown in FIGS. 1, 3, 4 and 5, another feature of the present invention includes providing spacing element, indicated generally as 62, intermediate the inner tank exterior surface 17 and the subsequently applied outer sheath 56 to effect substantially free passage of liquids along a substantial portion of the inner tank exterior surface 17. The spacing element 62 may conveniently be formed of a perforate material such as wire or thermoplastic mesh, illustrated as 64 in FIGS. 1, 3 and 4. This may suitably be the type of mesh conventionally used in reinforcing concrete structures over which a layer of imperforate material, such as paper or a stretched film of a synthetic resin material, may be applied. Examples of suitable spacing means of this type are disclosed in U.S. Pat. Nos. 4,644,627 and 4,640,439 both invented by David T. Palazzo, the inventor of the present invention. Other suitable types of spacing material 64 are described in further detail in U.S. Pat. Nos. 4,744,137, 4,780,947 and 4,780,946 by David T. Palazzo, the inventor of the present invention. Of course, other embodiments of the spacing element 62 may also be used, so long as they provide for substantially free passage of liquids between a substantial portion of the inner tank exterior surface 17 and the outer sheath 56. Some alternative preferred spacing elements will now be described.

Figure 6:
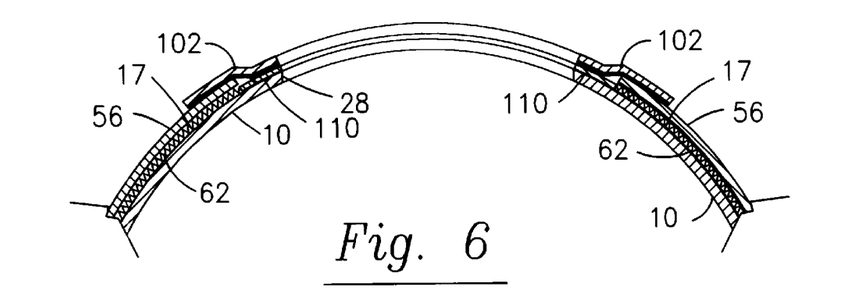
FIG. 6 is a fragmentary sectional similar to FIG. 5, illustrating another alternative preferred embodiment.

One such preferred alternative of spacing element 62 includes applying a relatively thin flexible film, suitably having generally smooth surfaces, over the properly prepared inner tank exterior surface 17. This spacing element 62 is particularly desirable when a heated or molten outer sheath 56 is applied, such as by extruding a plurality of overlapping layers, over the spacing element 62 and inner tank 10. A suitable such film should have higher melting temperature than the temperature of the outer sheath when applied, such that as a heated outer sheath 56 is applied over and engages the film 62, the film 62 wrinkles or forms a plurality of crinkles, as shown in FIG. 6, but does not melt, thereby providing ridges or grooves for the desired substantially free flow of liquids between the outer sheath 56 and the inner tank 10. Such film also may bond to outer sheath 56. Preferably, the ridges or grooves are positioned generally circumferentially about inner tank 10 adjacent the inner surface of outer sheath 56. The flexible film may, for example, be formed of an elongated sheet of polyester material such as MYLAR®. Preferably the film 62 is spirally wrapped around the tank 10 from end to end in partially overlapping layers, suitably as the tank 10 is rotated about its axis 22. Film 62 also may be co-extruded with outer sheath 56. Of course, film 62 may also be applied by other methods known in the art, such as by spraying it on or laying it up in sheets.

In order to provide for the desired bonding between outer sheath 56 and resin layer 34 around aperture 28, sufficient surface area of resin layers 34 should be left exposed to outer sheath 56 to permit engagement therebetween around aperture 28. For example, where mylar film 62 is used, a portion of the film 62 that covers resin layer 34 surrounding aperture 28 should be removed. However, the film should be prevented from falling off of or disengaging from inner tank 10. This may conveniently be accomplished by causing film 62 to attach to a portion of tank outer surface 17, to a portion of resin layer 34 or to both. proximal the periphery of resin layer 34 around the aperture 28, such as by applying an adhesive material, which may include a double sided mastic or adhesive strip, an adhesive liquid or other known adhesive products, proximal to the resin layer periphery around aperture 28. Of course, rather that removing film 62 from the resin layers outer surfaces, film 62 may be applied so as to leave at least a portion of such surface area exposed, such that outer sheath 56 may engage the resin layers 34, 36 and 38.

As shown in FIG. 1, the next step includes applying an outer sheath 56 of a substantially liquid impervious thermoplastic synthetic resin material, such as a polyolefin, namely polyethylene, polypropylene, a thermosetting resin, a catalyzing resin or other appropriate synthetic resins, over the inner tank 10 and the resin layers 34, 36 and 38. Preferably, at least a portion of the outer sheath 56 is spaced from at least a portion of the inner tank exterior surface 17, suitably at least the lower portion, by spacing element 62 as described above.

Outer sheath 56 may conveniently be applied as a single sheet of a thermoplastic synthetic resin material, such as a polyolefin, namely polyethylene, that is wrapped around inner tank 10, spacing material 62 and resin layers 34, 36 and 38. The sheet may conveniently be a pre-extruded sheet of polyethylene that is wrapped tightly around the inner tank, resin layers and spacing material with the ends of the sheet being welded together laterally along the length of the tank. This type of outer sheath also may conveniently be formed of a glass fiber resin material similar to that disclosed in U.S. Pat. No. 4,644,627 to David T. Palazzo. A sheet of pre-extruded polyethylene is preferably sufficiently flexible to wrap around the cylindrical inner tank 10, and may conveniently have a thickness of about 0.125 inch to about 0.25 inch. After the outer sheath 56 is tightly wrapped around inner tank 10 its ends secured, such as by welding, and it may then be bonded to the resin layers as is described in greater detail below.

Figure 7:
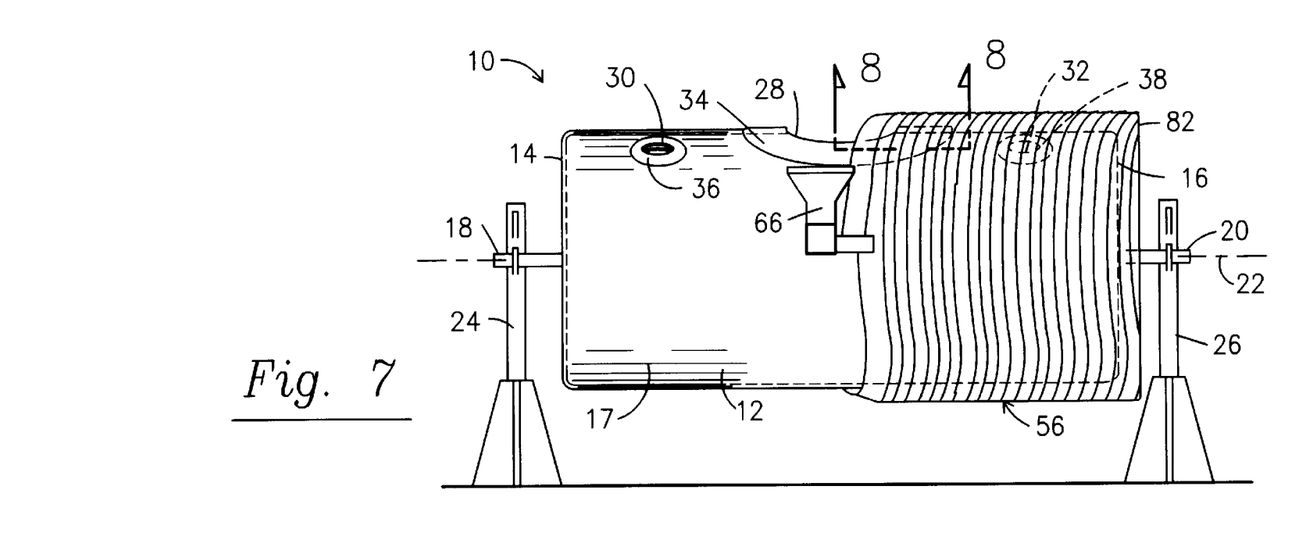
FIG. 7 is a side elevation, partially in section, of an alternative preferred embodiment of the tank of FIG. 1, illustrating the steps in making it.
Figure 8:
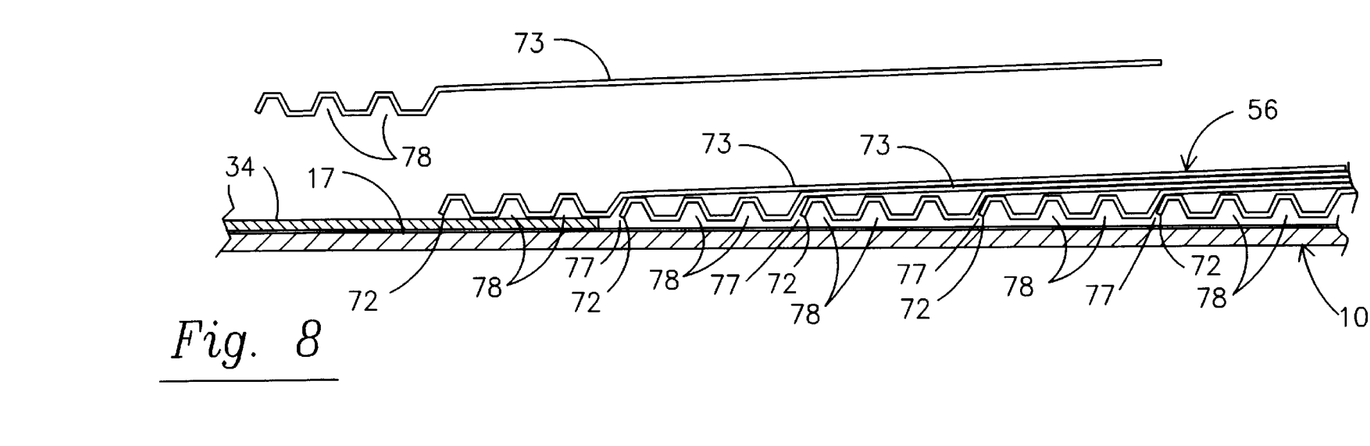
FIG. 8 is a fragmentary sectional view taken along lines 8—8 of the tank of FIG. 7 illustrating the overlapping extruded layers.
Figure 9:
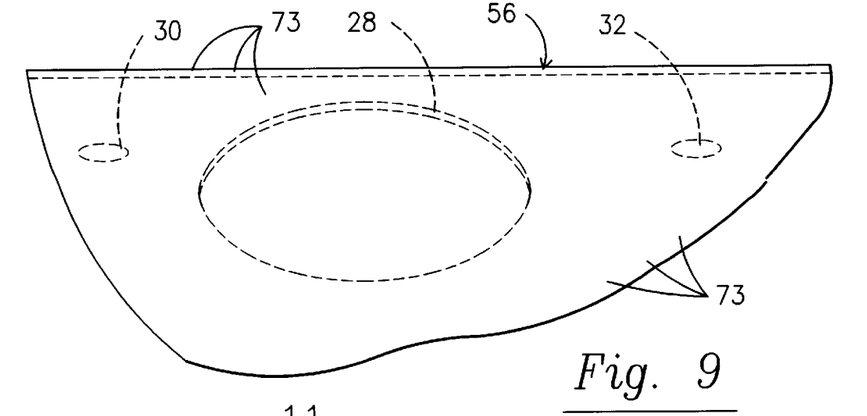
FIG. 9 is a fragmentary upper perspective view of an alternative preferred embodiment of the tank of FIG. 1 with an outer sheath overlaying apertures in the inner tank.

FIGS. 7 and 8 show an alternative embodiment where the outer sheath 56 is helically extruded by extruder 66 in situ over inner tank 10 and resin layers 34, 36 and 38 as a plurality of partially overlapping strips or layers, which may suitably be heated to a molten resin of about 150 to about 600 degrees Fahrenheit, to facilitate bonding between the plurality of partially overlapping layers. Such an extrusion process may be similar to that shown and described in U.S. patent application Ser. No. 08/735,610, the detailed description of which is incorporated herein by reference. Outer sheath 56 may be extruded by a conventional extruder 66, such as, for example, those commercially available from GENCA of Clearwater, Fla., onto inner tank 10 as it is rotated. Of course, extruders from other vendors may also be used. In addition, when a film, as described herein, is used as spacing element 62, applying outer sheath 56 over film 62 conveniently causes spacing element 62 to crinkle, shown in FIG. 6, defining a plurality of wrinkles and increasing the flow of liquids. Each successive overlapping layer 73 of outer sheath 56 has a predetermined width that is substantially less than the axial length of the cylindrical sidewall portions of inner tank 10, suitably about two inches to about twelve inches. Each overlapping layer 73 also includes an inner surface 70 and a leading edge 72. Preferably, the overlapping layers 73 are extruded such that at least half, and suitably about four-fifths of width of each layer overlaps the preceding layer, shown in FIG. 8.

Preferably, the plurality of partially overlapping layers 73 are extruded such that the intersection of the overlapping layers 73 form a corrugated inner surface of outer sheath 56 defining a plurality of channels 77 intermediate the outer sheath and the inner tank suitably adjacent the inner tank exterior surface 17. These channels 77 preferably extend adjacent the sidewall portions 12 generally circumferentially about inner tank 10 between the inner tank and the outer sheath 56 to provide for desired substantially free flow of liquids between the inner tank and the outer sheath as well as increase the stiffness of the outer sheath in the radial direction with respect to axis 22. A portion of the corrugated inner surface, or a material attached thereto, such as film 62 of FIG. 6, may engage the inner tank exterior surface 17, still allowing the substantially free flow of liquids within channels 77. By modifying the amount of overlap between the extruded layers 73 of outer sheath 56, the number of channels 77 may conveniently be increased or decreased, with a corresponding change in the rigidity of outer sheath 56. In addition, spacing elements 62, such as those described herein, may be used in combination with the plurality of channels 77 formed by the overlapping layers 73 to increase the free flow of liquids between the inner tank 10 and the outer sheath 56.

As illustrated in FIGS. 7 and 8, rather than applying a spacing material 64 as set forth above, the spacing element 62 may be provided intermediate inner tank exterior surface 17 and outer sheath 56 by forming protrusions, which may also be ridges, projections or grooves, indicated as 78, on the inner surface 70 of at least a plurality, and preferably all of, those partially overlapping extruded layers. Such protrusions 78 are preferably formed proximal the leading edge 72 of each layer such that at least a portion of the protrusions 78 of each overlapping layer engage the inner tank exterior surface 17. In order to form such protrusions 78, appropriate modifications may be made to the extrusion die of the extruder 66 or, in the alternative, the extruded polyethylene material may be fed from the extruder 66 through a series of rollers appropriately configured to form the protrusions 78. In this manner, the step of providing spacing element 62 is effectively combined with the extrusion step by the formation of the ridges 78, still providing the desired substantially free passage of liquids between the outer sheath 56 and at least a portion of the inner tank exterior surface 17. These ridges 78 may conveniently be applied to outer sheath 56 in addition to the channels 77 formed by overlapping layers 73 to further provide for substantially free flow of liquids between inner tank 10 and outer sheath 56. Of course, such protrusions may also be formed on the inner surface of the preformed sheet of outer sheath 56. Spacing element 62, may also comprise a release material, applied to the inner tank exterior surface prior to extruding outer sheath 56 to inhibit bonding between the outer sheath 56 and the inner tank exterior surface 17, further increasing the flow of liquids there between.

The next step is bonding the outer sheath to at least a portion of the resin layers 34, 36 and 38 surrounding the apertures 28, 30 and 32, respectively, such that a substantially liquid-impervious seal is formed around each such aperture. It may be desirable to heat the inner tank proximal the apertures 30, 32 and 34 as the outer sheath 56 is being applied to promote adhesion or bonding between the respective resin layers 34, 36 and 38 and the outer sheath 56. This may conveniently be accomplished by attaching a heating member (not shown), such as by magnetically attaching or clamping, to the inner tank 10 proximal the apertures 28, 30 and 32. For example, when outer sheath is extruded, as the extruder approaches an aperture to which the heating member is attached, the heating member is disengaged from the inner tank to permit the extruder to extrude the overlapping successive layers 73 of the polyethylene sheath around the tank 10 and the apertures 28, 30 and 32 as the tank is rotated. As stated above, it may also be desirable to position a temporary cover over apertures or fittings, suitably by welding or clamping. Alternatively, or in addition to applying heat proximal the apertures during the application of outer sheath 56, bonding between outer sheath 56 and resin layers 34, 36 and 38, and thus the seal around fittings and manways, may be enhanced by heating the outer sheath proximal or surrounding the apertures subsequent to the application of outer sheath 56 to bond the outer sheath 56 to at least a portion of the resin layers 34, 36 and 38. This may conveniently be accomplished by applying a heated plate or blanket or the like to the outer sheath proximal to the resin layers surrounding the apertures, or by other known methods.

Figure 10:
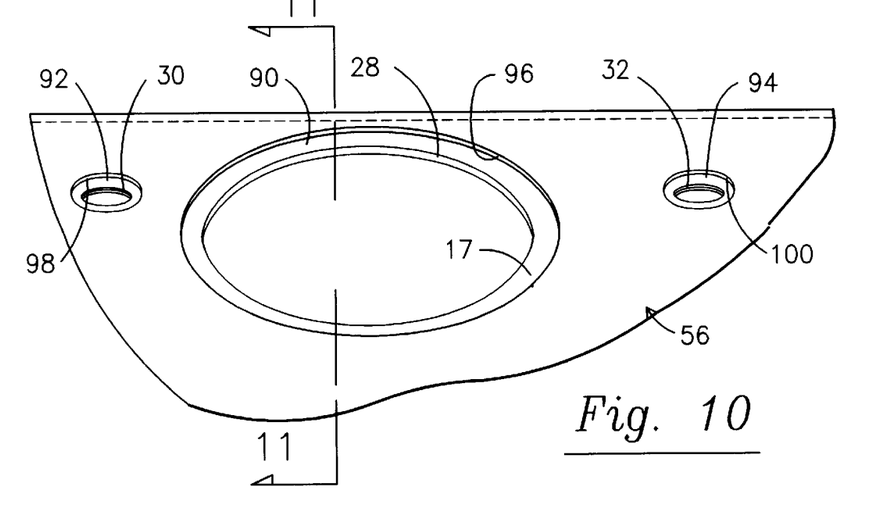
FIG. 10 is an upper perspective view of the tank of FIG. 9 with a portion of the outer sheath removed.
Figure 11:
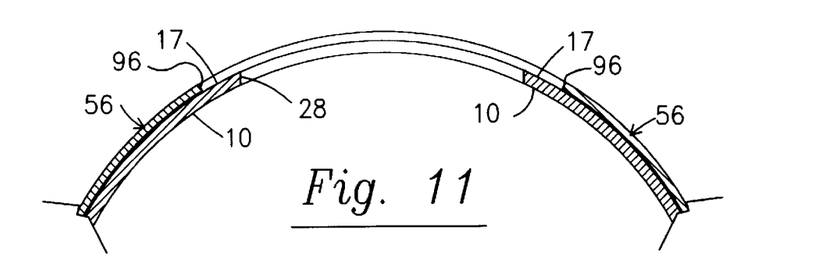
FIG. 11 is a fragmentary sectional view taken along line 11—11 of the tank of FIG. 10.
Figure 12:
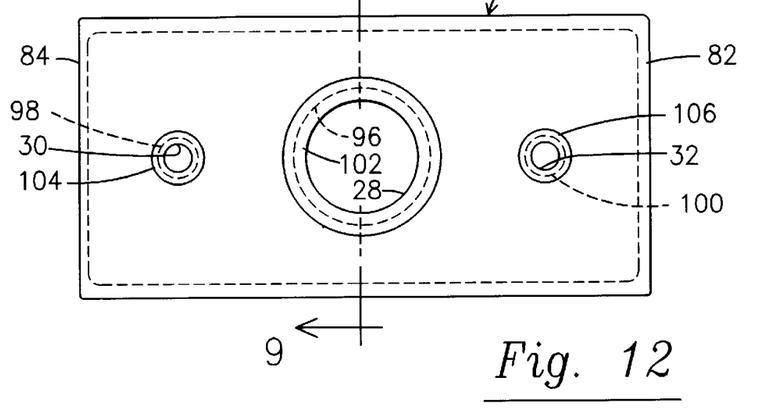
FIG. 12 is a top plan view of the tank of FIG. 13 illustrating the material surrounding the apertures.

Rather than applying a layer of synthetic resin material to the inner tank exterior surface 17 prior to applying the outer sheath 56, FIGS. 9–15 illustrate alternative preferred approaches, wherein the outer sheath 56 is applied to inner tank 10 before the resin layers are applied around the apertures 28, 30 and 32. In these alternative embodiments, the outer sheath 56 is formed by applying a substantially liquid impervious thermoplastic synthetic resin material, as described in greater detail above. After the outer sheath 56 has been applied to the inner tank 10, a portion of the outer sheath proximal to and surrounding each of the apertures 28, 30 and 32 is removed. This may conveniently be accomplished by cutting the outer sheath proximal and surrounding the apertures 28, 30 and 32, to define a cut in outer sheath 56 that is spaced from and surrounding each aperture. The portion of the outer sheath 56 within each cut may then be urged away from the inner tank exterior surface 17 to define openings 90, 92 and 94 through the outer sheath, as shown in FIG. 10. In addition, these cuts may also be made in outer sheath 56 prior to its application, such as when a single sheet outer sheath 56 is used. Each opening has a periphery, indicated as 96, 98 and 100, surrounding each respective aperture 28, 30 and 32. The removal of the portion of the outer sheath surrounding the apertures 28, 30 and 32 may be facilitated by a non-adhesive interface between the synthetic resin outer sheath 56 and the typically metallic inner tank. A release material, which may conveniently be spacing element 62 or other known release materials, such as, for example, wax, grease, silicone, polyvinyl acetate (PVA), polyolefins in the form of mesh, nets or films, dust or powders, among others, may be applied to inner tank 10 to ensure outer sheath 56 does not permanently bond to the inner tank 10 as well as provide for substantially free flow of liquids between inner tank 10 and outer sheath 56.

A layer of a thermoplastic synthetic resin material, which may conveniently be a polyolefin, such as polyethylene, polypropylene, or other conventional synthetic resins, is applied to a portion of the inner tank exterior surface 17 surrounding and proximal to at least a portion of each aperture 28, 30 and 32. Preferably, each resin layer is formed of a sheet or a patch 102, 104 and 106 having a central opening formed through the respective sheet 102, 104 and 106 with each opening being dimensioned according to the corresponding inner tank aperture 28, 30 and 32 adjacent to which it is to be applied. In addition, each sheet 102, 104 and 106 is preferably dimensioned, configured and positioned for overlapping the respective opening peripheries 96, 98 and 100 that are formed through the outer sheath 56. A suitable adhesive interface is provided between each resin layer sheet 102, 104 and 106 and the inner tank exterior surface 17 to promote the adhesion between the inner tank exterior surface 17 and the sheets.

Figure 13:
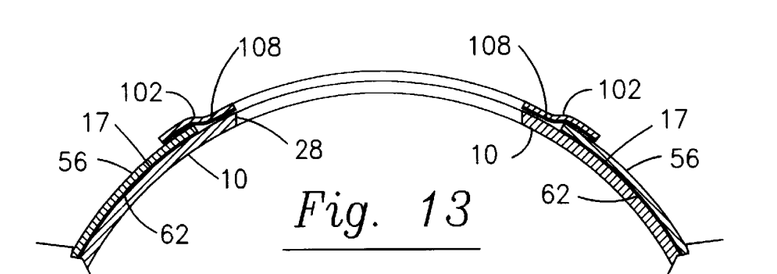
FIG. 13 is a fragmentary sectional view taken along line 13—13 of the tank of FIG. 12 illustrating the various layers of material applied in the fabrication process.

FIG. 13 illustrates a preferred embodiment of the application of sheet 102 in which an adhesive layer 108 is affixed to and integral with an inner surface of sheet 102 that is applied to aperture 28. Preferably, sheet 102 is formed of a sheet of cross linked polyolefin material that is coated with a high shear strength, hot melt adhesive, such as is commercially available as the Canusa Repair Patch (CRP) from Canusa of Ontario, Canada. Of course, other thermoplastic resin sheets and adhesives may be used with the present invention without departing from the scope of this invention. In this preferred embodiment, the adhesive material 108, suitably a hot melt adhesive, should be capable of forming relatively strong and substantially permanent seals to conventional thermoplastic synthetic resin materials, such as polyethylene and certain epoxy and polyester materials, as well as to certain metals, including steel.

In order to apply sheet 102 to the appropriately prepared tank around aperture 28, the hot melt adhesive 108 is heated and then urged into engagement with the inner tank exterior surface 17 surrounding and proximal to aperture 28, with the perimeter of sheet 102 overlapping the periphery 96 of opening 90 in the outer sheath 56, shown in FIG. 13. The area of the inner tank 10 and outer sheath 56 to which the sheet 102 is to be applied may be preheated, suitably with a propane torch or other known heating instruments, to further promote bonding between the sheet 102 and the tank 10 and outer sheath 56. In addition, after sheets 102, 104 and 106 are applied to the tank as described above and shown with respect to FIG. 13, the outer sheath is preferably bonded, suitably by heat welding, to those resin sheets, preferably proximal to the perimeter portions of the respective thermoplastic resin sheets 102, 104 and 106 that overlap the outer sheath 56 surrounding the aperture. In general, this bonding forms the desired substantially liquid impervious seal around each respective aperture. Accordingly, the spacing means 62 provided between the outer sheath 56 and the inner tank 10 enables substantially free flow of liquids there between and the seal prevents such liquids escaping from this interstitial space.

Figure 14:
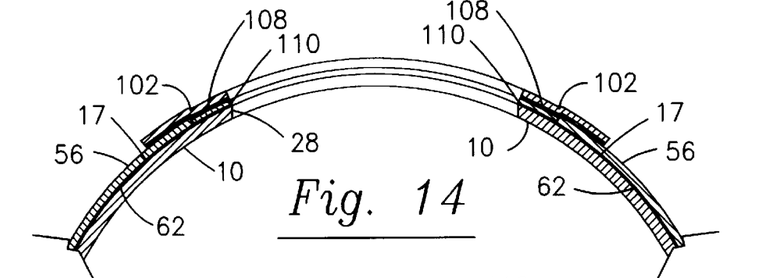
FIG. 14 is a fragmentary sectional view similar to that of FIG. 13, illustrating an alternative preferred embodiment.

To further promote bonding between the resin sheets 102, 104 and 106 and the inner tank exterior surface surrounding the respective apertures 28, 30 and 32, an additional adhesive material 110, such as an epoxy resin, may be applied to the inner tank exterior surface surrounding and proximal to each respective aperture. This is shown in FIG. 14 with respect to aperture 28, and this approach may be conveniently utilized with respect to each aperture 28, 30 and 32 of the tank. While, for purposes of illustration, the additional adhesive layer 110 is illustrated as comparably thick as the outer sheath 56, it will be understood and appreciated that the thickness of adhesive layer 110 will typically, although not necessarily, be substantially less than that of outer sheath 56.

Figure 15:
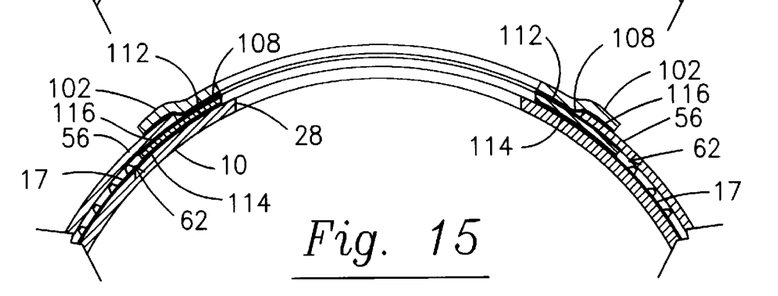
FIG. 15 is a fragmentary sectional view similar to FIGS. 13 and 14 illustrating yet another alternative preferred embodiment.

FIG. 15 illustrates yet another alternative approach for sealing the outer sheath 56 around each of the apertures 28, 30 and 32. In this embodiment an inner patch 112 of a thermoplastic synthetic resin material, such as, for example, polyethylene or polypropylene, is positioned adjacent to the inner tank exterior surface 17 surrounding and proximal to at least one, and suitably each, of the apertures 28, 30 or 32. Patch 112 is substantially similar to that illustrated and described with respect to FIGS. 3 and 4, with the inner and/or outer surfaces appropriately treated, such as by one of the methods described above, to promote adhesive bonding between the inner surface of the patch 112 and the inner tank exterior surface 17. Patch 112 is applied to the inner tank exterior surface prior to the extrusion of the outer sheath 56. A portion of the outer sheath proximal to and surrounding aperture 28 is removed, to define an opening in outer sheath 56 having a periphery intermediate the inner patch inner boundary surrounding the patch opening and the inner patch outer periphery. Thus, at least a portion, preferably a substantial part, of the outer surface of inner patch 112 is visibly exposed to an observer.

Substantially as described with respect to FIGS. 3 and 4 and as illustrated in FIG. 15, an adhesive material 114 and 116, suitably an epoxy resin, may be applied to the inner and outer surfaces, respectively, of patch 112 in order to promote adhesive bonding between the patch 112 and the inner tank exterior surface 17 and between the inner surface of sheet 102 and the outer surface of the patch 112. Adhesive layer 108 provides an adhesive interface between the sheet of synthetic resin layer 102 and the adhesive layer 116 of patch 112. Thus, by using the preferred combination of sheet 102 and adhesive layer 108, as described above, the adhesive layer may be heated and the adhesive layer 108 of sheet 102 urged into engagement with the adhesive material 116 of patch 112 to bond inner patch 112 to sheet 102 and to outer sheath 56, thereby forming a substantially liquid impervious seal and substantially monolithic layer between the outer sheath and the inner tank 10 surrounding aperture 28. A substantially identical process may also be used for apertures 30 and 32. As described above, an appropriate spacing means 62, which may conveniently be formed on the inner surface of outer sheath 56 or formed of a separate material, provide for substantially free passage of liquids between a substantial portion of the inner tank exterior surface 17 and a portion of the outer sheath 56.

To form the end portions 82 and 84 of the outer sheath 56, the synthetic resin material may simply be applied to the end portions, as shown in FIG. 1, or it may be extruded, as shown in FIG. 7, over the inner tank end portions 14 and 16 with or without appropriate spacing means. For the example when spindle members are employed to support inner tank 10 and outer sheath 56 is extruded, the outer sheath may conveniently be applied from spindle member 18 to spindle member 20, forming a continuous jacket structure over the cylindrical sidewalls 12 of inner tank 10 and end walls 14 and 16. To complete the end portions 82 and 84 most of the length of each such spindle member 18 and 20 is then removed from each respective end portion 14 and 16 and a patch of a substantially liquid-tight synthetic resin material, suitably polyethylene, is attached, such as by welding, to the end portions covering the area from where the respective spindle members 18 and 20 were removed.

Alternatively, the end portions 82 and 84 may be fabricated separately from the cylindrical wall of the outer sheath. This method of forming the end portions 82 and 84 separately may simplify the manufacturing process by permitting the formation of those end caps 82 and 84 over a male or female mold plug that would be appropriately secured and bonded to the extruded outer sheath 56 by welding or any other manner known to those skilled in the art. While the end caps 82 and 84 are illustrated in the drawings as substantially flat end caps, it will be appreciated and understood by those skilled in the art that end caps 82 and 84 may also be preformed cup or dome-shaped end caps. In addition, the end caps may conveniently be attached to the inner tank prior to applying the outer sheath 56, such that when it is applied, the outer sheath will substantially conform to the shape of the end cap. Thus, by providing a thermoplastic resin layer on the preformed end caps 82 and 84, the bonding between the end portions of the outer sheath and the end caps may be facilitated.

Figure 16:
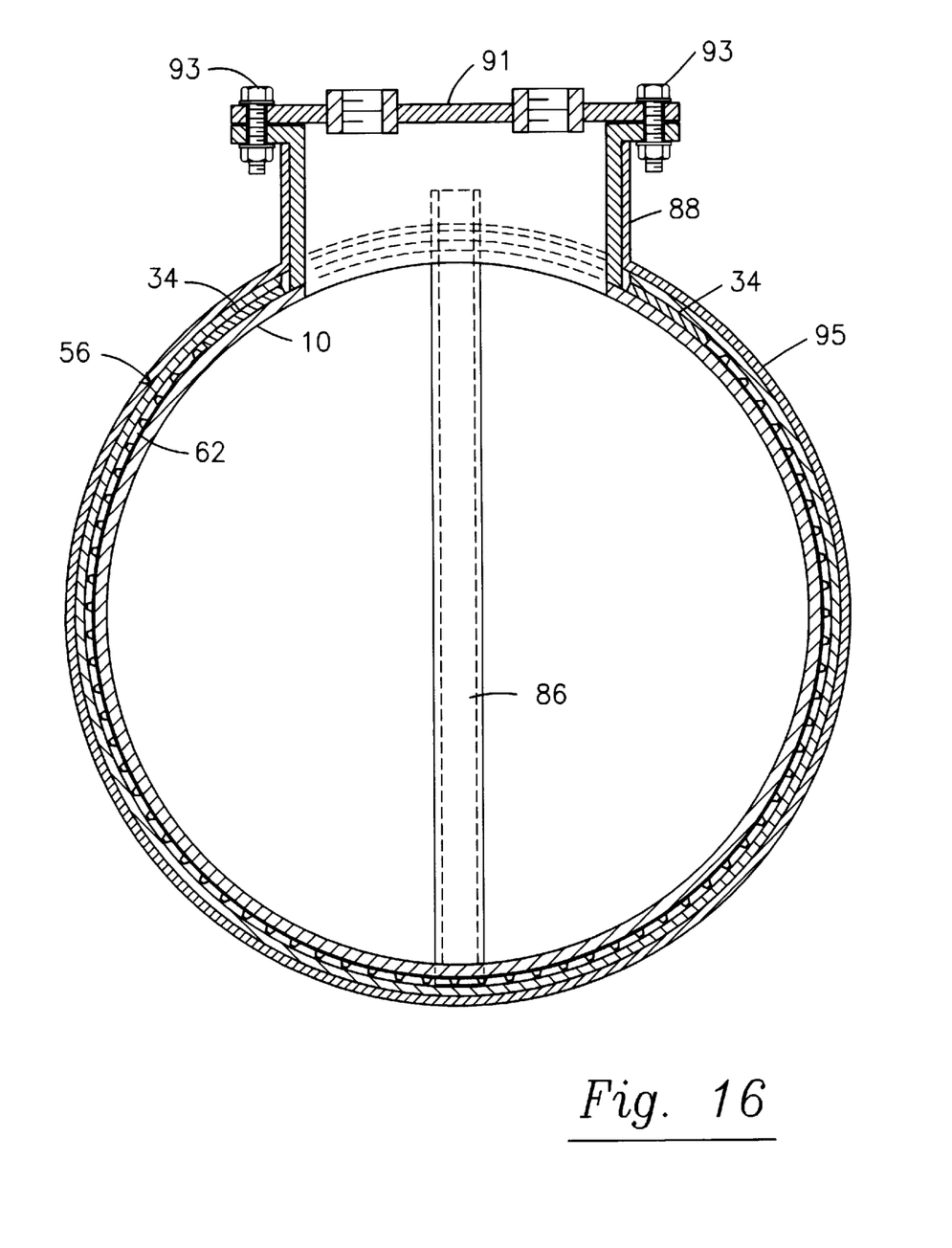
FIG. 16 is an end sectional view of a completed tank according to FIG. 1.

As shown in FIG. 16 the completed cross sectional view of a preferred embodiment of the tank may include a pipe or tube 86 extending through the tank itself for use in detecting the presence of liquids or a change in pressure in the volume between inner tank 10 and the outer sheath 56. The tube 86 may be installed into aperture 30 or 32, which suitably may include a threaded fitting. The tube 86 is inserted through the outer sheath 56 and aperture 30 and conveniently extends through and is sealed to an aperture formed in the lowermost portion of inner tank 10 so that the lower portion of tube 86 is positioned between the inner tank 10 and the outer sheath 56. Substantially, liquid-tight joints between the tube 86 and the inner tank 10 are formed in any conventional manner, such as by welding to the inner tank 10. The tube 86 may conveniently extend into the interstitial space between the outer sheath 56 and the inner tank 10 to test for fluids, such that liquid disposed within the interstitial space may conveniently be contacted by and withdrawn through the tube 86.

The remaining steps involved in the manufacture of the tank of the present invention generally depend upon the nature of the inner tank 10 used in manufacturing multiple wall storage tank of the present invention. In general, if not already done, appropriate holes may be cut by any suitable means, such as a hole saw or the like, to define or reform apertures 28, 30 and 32. Then, suitable piping and a cylindrical member 88, such as for a man way, may be appropriately secured, suitably by welding or threading to the apertures 28, 30 and 32 of the inner tank 10. In instances where patches and/or sheets have been affixed to the inner tank surrounding such apertures as described above, the piping and man way may conveniently be bonded to the respective layer of thermoplastic resin material surrounding and proximal to the apertures 28, 30 and 32 such as by heat welding or by applying an appropriate adhesive material to the interface between the cylindrical member 88 or piping and the thermoplastic resin layer surrounding such interface. In addition the piping or manway may be secured to the inner tank, such as by threading or welding. A cover plate 91 may conveniently be secured to the upper flange of the cylindrical member 88 by a conventional means, such as bolts 93. When all the fittings and cover plates are secured to the tank, an appropriate resin material 95 may be applied over the tank to yield a finished structure such as shown in the cross sectional view of FIG. 16.

By the foregoing construction there is provided a multiple wall tank that can be manufactured economically from a conventional single wall tank, and even from a used tank that has previously been removed from underground storage use. This structure provides an outer sheath, which may be formed from a material that is free of tendency to rust or corrode, substantially sealed to the inner tank around an aperture and at least a portion of which may be spaced from the inner tank exterior surface by a spacing means to define an interstitial space in which the collection and detection of liquids may be determined, such as by simply detecting the presence of liquids or a change in pressure within that space.

While the foregoing describes in detail several preferred embodiments of the present invention, it is to be understood that such description is illustrative only of the principles of the invention and is not to be considered limitative thereof. Because numerous variations and modifications of the present invention will readily occur to those skilled in the art, the scope of this invention is to be limited solely by the claims appended hereto.

What is claimed is:

1. A method of manufacturing a multiple wall tank for the storage of liquids having an outer jacket bonded to an inner tank surrounding and proximal to an inner tank aperture, said method comprising the steps of:

providing a rigid, inner tank having generally cylindrical sidewall portions, end portions generally transverse to said sidewall portions and a central axis extending generally longitudinally between said end portions, with said inner tank having an exterior surface, and at least one aperture formed through said inner tank;

applying a first thermoplastic synthetic resin material to a portion of said exterior surface of said inner tank surrounding and proximal to at least a portion of said aperture to define a layer of resin material surrounding and proximal said aperture;

applying an outer sheath of a substantially liquid-impervious thermoplastic synthetic resin material over said inner tank and said synthetic resin layer;

providing spacing means intermediate said exterior surface of said inner tank and said outer sheath to provide for substantially free passage of liquids between a substantial portion of said exterior surface of said inner tank and at least a portion of said outer sheath; and bonding said outer sheath to said resin layer surrounding and proximal to said aperture, such that a substantially liquid-impervious seal is formed between said outer sheath and said inner tank around said aperture.

2. A method as in claim 1 wherein said first thermoplastic synthetic resin material comprises a patch of a polyolefin material, said patch having first and second surfaces.

3. A method as in claim 2 further comprising the steps of:

interposing a layer of an adhesive material between said first surface of said patch and said inner tank exterior surface;

urging said first surface of said patch and said inner tank outer surface into engagement with said adhesive material to secure said patch to said inner tank exterior surface; and bonding said outer sheath to said patch second surface surrounding said aperture.

4. A method as in claim 3 wherein said step of bonding further comprises heating said outer sheath proximal said aperture to bond said outer sheath to at least a portion of said thermoplastic synthetic resin layer.

5. A method as claimed in claim 1 wherein, prior to applying said outer sheath proximal said aperture, said method comprises the step of heating said resin layer proximal to said aperture, such that said resin layer forms a continuous and viscous layer of material.

6. A method as claimed in claim 5 wherein said step of heating said inner tank proximal said aperture comprises the step of attaching a heated member to said inner tank proximal to said aperture.

7. A method as in claim 1 wherein, prior to said step of applying said first thermoplastic synthetic resin material to a portion of said inner tank, said method comprises the steps of:

heating said inner tank proximal said aperture;

applying a thermosetting material to a portion of said inner tank exterior surface surrounding and proximal said aperture, such that said thermosetting material bonds to said inner tank exterior surface;

applying a second thermoplastic resin material to said thermosetting material surrounding and proximal to said aperture, such that said second thermoplastic resin material bonds to said thermosetting material; and applying said first thermoplastic resin material to at least a portion of said second synthetic resin material surrounding and proximal to said aperture, such that said first thermoplastic resin material bonds to said second thermoplastic resin material, thereby forming a substantially composite layer of materials intermediate said inner tank and said outer sheath.

8. A method as in claim 7 wherein said thermosetting material comprises an epoxy resin material that forms a substantially continuous layer of material surrounding and proximal to said aperture.

9. A method as in claim 8 wherein each of said thermosetting material, said adhesive material and said thermoplastic synthetic resin material forms a viscous layer when applied and bonds to each adjacent layer of material when cooled, whereby a substantially composite layer of materials is formed intermediate the inner tank and the outer sheath to define a substantially liquid-impervious seal between the outer sheath and the inner tank around the aperture.

10. A method as in claim 1 wherein said step of applying said outer sheath further comprises the step of helically extruding a plurality of partially overlapping layers of a thermoplastic synthetic resin material over said inner tank and said first synthetic resin layer to form said outer sheath, with each successive said overlapping layer having an inner surface, a leading edge and a predetermined width substantially less than the axial length of said inner tank.

11. A method as in claim 10 wherein said extruding step further comprises extruding said outer sheath such that at least half of said width of each said successive layer overlaps the preceding said layer.

12. A method as in claim 11 wherein about four-fifths of said width of each said successive layer overlaps the preceding said layer.

13. A method as in claim 11 wherein said step of providing said spacing means comprises the step of forming protrusions on said inner surface of at least some of said partially overlapping extruded layers proximal to said leading edge of each said layer, such that at least a portion of said protrusions of each said extruded layer engage said inner tank exterior surface, thereby providing for substantially free passage of liquids between said outer sheath and at least a substantial portion of said inner tank exterior surface.

14. A method as in claim 10 wherein said first thermoplastic synthetic resin material comprises a polyolefin resin material.

15. A method as in claim 10 wherein said synthetic resin layer comprises a patch of a polyolefin resin material having opposed first and second surfaces, and prior to said step of applying said first thermoplastic resin material to said inner tank exterior surface, said method comprises the step of treating said first surface of said patch to polarize at least a portion of said first surface to facilitate attaching said patch first surface to said inner tank exterior surface.

16. A method as in claim 10 wherein said step of bonding further comprises heating said outer sheath proximal to said aperture to bond said outer sheath to at least a portion of said thermoplastic synthetic resin layer.

17. A method as claimed in claim 10 wherein, prior to extruding said outer sheath proximal said aperture, said method comprises the step of heating said inner tank and said synthetic resin layer proximal said aperture.

18. A method as claimed in claim 17 wherein said step of heating said inner tank proximal said aperture comprises the step of positioning a heated member proximal to said aperture to facilitate securing said outer sheath to at least a portion of said synthetic resin layer.

19. A method as in claim 10 wherein, prior to said step of applying said thermoplastic synthetic resin material to a portion of said inner tank, said method comprises the steps of:

heating said inner tank proximal said aperture;

applying a thermosetting material to a portion of said inner tank exterior surface surrounding and proximal to said aperture;

applying a second thermoplastic synthetic resin material to said thermosetting material surrounding and proximal to said aperture, such that said second thermoplastic resin material bonds to said thermosetting material; and said step of applying said first thermoplastic synthetic resin material to said portion of said inner tank further comprises applying said first thermoplastic synthetic resin material to at least a portion of said second thermoplastic resin material surrounding and proximal to said aperture, such that said first thermoplastic synthetic resin material bonds to said second synthetic resin material, thereby forming a substantially monolithic layer of materials intermediate said inner tank and said outer sheath.

20. A method as in claim 19 wherein said thermosetting material comprises an epoxy resin material that forms a substantially continuous layer surrounding and proximal to said aperture.

21. A method in claim 19 wherein said step of heating causes each of said thermosetting material, said adhesive material and said thermoplastic synthetic resin material to form a viscous layer that chemically bonds to each adjacent layer of material when cooled, whereby a substantially monolithic layer is formed intermediate the inner tank and the outer sheath to define a substantially liquid-impervious seal between the outer sheath and the inner tank around the aperture.

22. A method of manufacturing a multiple wall tank for the storage of liquids comprising the steps of:

provide a rigid, inner tank having generally cylindrical sidewall portions, closed end portions generally transverse to said sidewall portions and a central axis extending generally longitudinally between said end portions, with said inner tank having an exterior surface;

applying a thermoplastic synthetic resin material to a predetermined portion of said exterior surface of said inner tank to form a layer of resin material attached to said predetermined portion of said inner tank, with at least a portion of said resin layer being treated to promote the adhesion thereof to said inner tank exterior surface;

applying an outer sheath of a substantially liquid-impervious thermoplastic synthetic resin material over said inner tank and said first synthetic resin layer, said outer sheath having an inner surface and an exterior surface; and providing a spacing means intermediate said inner tank exterior surface and said outer sheath inner surface to provide for substantially free passage of liquids between a substantial portion of said exterior surface of said inner tank and at least a portion of said outer sheath;

bonding said outer sheath to a predetermined portion of said first resin layer; and subsequent to said step of applying said outer sheath, forming an aperture through said outer sheath, said resin layer and said inner tank, such that a substantially liquid-impervious seal between said outer sheath and said resin layer is formed surrounding and proximal to said aperture.

* * * * *